(12) United States Patent
Kinoshita et al.

(10) Patent No.: US 8,020,771 B2
(45) Date of Patent: Sep. 20, 2011

(54) MEDIA PROCESSING DEVICE

(75) Inventors: Yoshiki Kinoshita, Nagano-ken (JP);
Hideki Furihata, Nagano-ken (JP);
Toru Takami, Nagano-ken (JP); Akira Nakazawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 943 days.

(21) Appl. No.: 11/960,066

(22) Filed: Dec. 19, 2007

(65) Prior Publication Data

US 2008/0156875 A1    Jul. 3, 2008

(30) Foreign Application Priority Data

Dec. 28, 2006  (JP) ................................ 2006-353821
Feb. 8, 2007  (JP) ................................ 2007-028848

(51) Int. Cl.
*G06K 5/00* (2006.01)
(52) U.S. Cl. ........................................ 235/475; 235/380
(58) Field of Classification Search .................. 235/498, 235/474, 380, 379, 437, 486, 475, 375
See application file for complete search history.

(56) References Cited

U.S. PATENT DOCUMENTS

| | | | |
|---|---|---|---|
| 4,560,293 A | | 12/1985 | McCumber et al. |
| 5,444,616 A | * | 8/1995 | Nair et al. .......................... 705/17 |
| 5,448,047 A | * | 9/1995 | Nair et al. ...................... 235/440 |
| 5,479,532 A | * | 12/1995 | Abel et al. ..................... 382/137 |
| 5,679,938 A | * | 10/1997 | Templeton et al. ........... 235/379 |
| 5,679,940 A | * | 10/1997 | Templeton et al. ........... 235/380 |
| 6,109,521 A | | 8/2000 | Martinez et al. |
| 6,302,563 B1 | * | 10/2001 | Yama ............................ 362/253 |
| 6,473,519 B1 | * | 10/2002 | Pidhirny et al. ............... 382/140 |
| 7,702,276 B2 | * | 4/2010 | Kawashima ................... 399/367 |
| 2002/0140164 A1 | | 10/2002 | Frey et al. |
| 2002/0191830 A1 | * | 12/2002 | Pidhirny et al. ............... 382/140 |
| 2004/0114197 A1 | * | 6/2004 | Sheng et al. .................. 358/474 |
| 2004/0257626 A1 | | 12/2004 | Panini et al. |
| 2005/0127182 A1 | | 6/2005 | Nagata et al. |
| 2005/0129440 A1 | | 6/2005 | Nagata et al. |
| 2006/0268376 A1 | * | 11/2006 | Kawashima ................... 358/498 |
| 2008/0130070 A1 | * | 6/2008 | Walker et al. ................. 358/496 |

FOREIGN PATENT DOCUMENTS

| | | |
|---|---|---|
| JP | 2005255383 | 9/2005 |
| JP | 2005255384 | 9/2005 |
| JP | 2005324916 | 11/2005 |
| WO | 9410649 | 5/1994 |

* cited by examiner

*Primary Examiner* — Thien M Le
(74) *Attorney, Agent, or Firm* — Mark P. Watson

(57) ABSTRACT

Swinging open the upstream-side cover part (31) and downstream-side cover part (32) of the check scanning apparatus (1) on a common support pivot (33) opens a U-shaped check transportation path (5). The check transportation path (5) can be opened with a simple single-action operation to remove checks (4) jammed in the check transportation path (5) and for maintenance of the magnetic head (84) and contact image sensors (82 and 83). When the task is completed, the open check transportation path (5) can also be returned to the original closed position by a simple single-action operation. If only those parts that require maintenance are exposed when the check transportation path is open, tasks that require opening the transportation path can be done without damaging other parts and without soiling the operator's fingers.

11 Claims, 10 Drawing Sheets

MEDIA PROCESSING DEVICE

CROSS-REFERENCE TO RELATED APPLICATIONS

Japanese Patent application Nos. 2006-353821 and 2007-028848 are hereby incorporated by reference in their entirety.

BACKGROUND

1. Field of Invention

The present invention relates to a media processing device such as a check reader that is used to scan sheet media and for reading magnetic ink characters from the sheet media on which information is printed using magnetic ink characters, such as checks, promissory notes, and invoice stubs.

2. Description of the Related Art

Banks and other financial institutions commonly use check reading devices ("check reader" or "check scanner") to scan documents and read magnetic ink characters from documents such as checks, promissory notes, and invoice stubs, and sort and process the documents based on the result of reading the documents (collectively referred to below as checks). The check reader is usually used on a desk or counter, and the transportation path that carries the check or other document through the check reader is therefore generally U-shaped from the check supply side to the check exit side in order to reduce the size and afford a compact check reader.

In order to remove a check that is jammed inside the U-shaped transportation path, and to clean the magnetic head or scanner (image scanning apparatus) positioned along the transportation path or perform other regular maintenance on this type of check reader, the case is removed to open the transportation path and expose the magnetic head and other parts.

United States Patent Application 2004/0257626 describes a scanner apparatus for scanning bank checks that has this type of arrangement. The part of the case covering the U-shaped transportation path that covers the part where the scanner is located in this check scanner apparatus can be removed. The sensor part of the scanner can pivot on a vertical axis to open and close to the stationary side of the scanner unit. If a check jams in the transportation path, the top part of the case is removed, the sensor part of the scanner is opened, and the check can be removed from the transportation path.

However, when the top of the case is removed to expose the transportation path and remove the jammed check, circuit boards and other parts of the transportation path, for example, that are inside and normally covered by the case are also exposed, and the user's fingers, tools, or other objects can easily touch these other parts. Touching these exposed parts can short the circuit board, damage parts, and dirty the fingers. Touching exposed parts with maintenance tools during cleaning or other maintenance of the scanner or magnetic head can also damage those parts. Reinstalling the removed top case to the original position also requires precisely positioning and fitting the case, and installing the case top with a simple single-action is difficult.

SUMMARY OF THE INVENTION

A media processing device according to the present invention enables changing the media transportation path to an open position with a simple single-action operation without damaging internal parts and without soiling an operator's fingers when, for example, removing a sheet medium that is jammed in the media transportation path, and enables returning the media transportation path to the original position with a simple single-action operation without damaging internal parts after the task is completed.

A media processing device according to a first aspect of the invention has a media transportation path for conveying sheet media; a device case that forms the media transportation path; an operating cover openably and closably attached to the device case; and a support pivot that determines the opening and closing axis of the operating cover; wherein a transportation path portion that is at least a part of the media transportation path is formed between the device case and the operating cover in the closed position; and when the operating cover opens from the closed position, the transportation path portion changes to an open position.

When the operating cover of this media processing device opens pivoting on the support pivot, the transportation path part also opens. The transportation path part can therefore be opened with a simple operation and tasks such as removing jammed sheet media and maintenance of the scanner and other internal parts can be done easily. After the task is completed, the open transportation path portion can be easily returned to the original closed position by simply swinging the operating cover on the support pivot to the closed position. Because the operating cover can be opened and closed by touching only the operating cover, there is no damage to internal parts or concern about soiling the operator's fingers.

Preferably, the media transportation path has a prescribed width that extends and curves in a U-shaped configuration; the operating cover includes an upstream-side operating cover part that defines an upstream-side transportation path portion of the media transportation path, and a downstream-side operating cover part that defines a downstream-side transportation path portion of the media transportation path; and the opening and closing axis of the upstream-side operating cover part and the downstream-side operating cover part is the support pivot.

When the upstream-side operating cover part and the downstream-side operating cover part that define the U-shaped media transportation path open pivoting on a common support pivot, both the upstream-side transportation path portion and the downstream-side transportation path portion of the media transportation path change to an open position. The upstream-side and downstream-side transportation path portions can therefore be opened with a simple single-action operation, and sheet media that is jammed inside can be easily removed. When the task is completed, the upstream-side and downstream-side transportation path portions can also be returned to the original closed position by the simple single-action operation of pivoting the upstream-side operating cover part and the downstream-side operating cover part closed on the common support pivot. Furthermore, because the operation that changes the upstream-side and downstream-side transportation path portions to the open position and the operation that returns them to the closed position can be done by touching only the upstream-side operating cover part and the downstream-side operating cover part, there is no damage to internal parts or concern about soiling the operator's fingers.

Further preferably, the media processing device has one or a plurality of upstream-side transportation rollers and upstream-side pressure rollers for pressing the sheet media to the upstream-side transportation rollers in order to convey the sheet media along the upstream-side transportation path portion. The media processing device also has one or a plurality of downstream-side transportation rollers and downstream-side pressure rollers for pressing the sheet media to the downstream-side transportation roller in order to convey the sheet media along the downstream-side transportation path portion. The upstream-side transportation roller and the downstream-side transportation roller are positioned to the device case side of the media transportation path, the upstream-side pressure roller is positioned to the upstream-side operating cover part, and the downstream-side pressure roller is positioned to the downstream-side operating cover part. Opening the upstream-side and downstream-side operating cover parts separates and opens the transportation rollers and pressure rollers, and sheet media held between these rollers and stuck in the media transportation path can be easily removed.

Yet further preferably, a media processing device used in a check scanning apparatus also has a magnetic head positioned near the media transportation path for reading magnetic ink characters printed on the sheet media, and opening the operating cover exposes the magnetic head. This arrangement enables simply opening the operating cover to easily remove a check or other sheet media that is jammed in the magnetic head area, and to easily clean or perform other maintenance on the magnetic head.

Yet further preferably, a media processing device used in a check scanning apparatus also has an image scanning apparatus positioned near the media transportation path for scanning the sheet media, and opening the operating cover exposes the image scanning surface of the image scanning apparatus to the outside of the device case. This arrangement enables simply opening the operating cover to easily remove a check or other sheet media that is jammed in the image scanning apparatus area, and to easily clean or perform other maintenance on the image scanning apparatus.

If the media processing device is used in a check scanning apparatus, it preferably has a pair of image scanning apparatuses for scanning both sides of the processed checks. In this case a first image scanning device positioned on the device case side of the media transportation path, and a second image scanning device positioned on the operating cover.

If the media processing device is used in a check scanning apparatus, it preferably also has a print mechanism positioned near the media transportation path for printing on the sheet media so that text such as PROCESSED or an endorsement can be printed on the check, and opening the operating cover exposes the print mechanism. This arrangement enables simply opening the operating cover to easily remove a check or other sheet media that is jammed in the print mechanism area, and to easily replace consumables or perform other maintenance on the print mechanism.

Further preferably, the upstream-side operating cover part and the downstream-side operating cover part are locked by separate latch mechanisms in a closed position defining the upstream-side and downstream-side transportation path portions. The separate latch mechanisms lock the covers in the closed position with good precision, and thereby position the magnetic head, the image scanning apparatus, and the print mechanism positioned to the covers with good precision.

A media processing device according to another aspect of the invention has a media transportation path for conveying sheet media, a device case that forms the media transportation path; an operating cover openably and closably attached to the device case, and a support pivot that determines the opening and closing axis of the operating cover, and is arranged so that a transportation path portion that is at least a part of the media transportation path is formed between the device case and the operating cover in the closed position, and the transportation path portion changes to an open position when the operating cover opens from the closed position. The operating cover has an inside wall part that defines the transportation path portion, a support-pivot-side end-face part that is contiguous with the end of the inside wall part on the support pivot side, and an outside wall part that is contiguous with the support-pivot-side end-face part. The support-pivot-side end-face part is defined by a convex circular arc surface centered on the support position, and the inside wall part extends tangentially to the convex circular arc surface from an end of the convex circular arc surface.

Opening the operating cover of the media processing device according to this aspect of the invention opens at least a part of the transportation path. Because this part of the transportation path can be opened by the simple single-action operation of opening the operating cover, tasks such as removing a check jammed in the transportation path and maintenance of the image scanning apparatus can be done efficiently.

If part of the device case is the operating cover, the position of the support pivot that defines the pivot axis of the operating cover must be shifted to the outside of the device case so that the pivot axis end of the operating cover does not interfere with other parts on the device case side when the operating cover opens and closes. Furthermore, if the pivot axis end of the operating cover protrudes into the transportation path when the operating cover is open, a check that is jammed in this area, for example, will be pressed by the end of the operating cover, thus making removing the jammed check difficult. It is therefore necessary to move the position of the support pivot to the outside of the device case so that the pivot axis end of the cover does not protrude into the transportation path when the cover is open. However, if the support pivot is moved to the outside, the part of the device case or the part of the operating cover covering the support pivot must protrude further to the outside than other parts of the case surface. This can detract from the appearance of the device.

As described above, the contour of the end part of the operating cover on the support pivot side is defined by a convex circular arc surface centered on the support pivot. The inside wall part extends tangentially to the convex circular arc surface from one end of the convex circular arc surface, and defines the part of the transportation path on the operating cover side. When the operating cover is open, the support pivot end of the cover will therefore not protrude more to the inside than the same end when the cover is closed. In other words, the support pivot end of the operating cover will not protrude into the transportation path. The sheet media will therefore not be pressed to the device case side as a result of the end of the operating cover protruding into the transportation path when the operating cover is opened to remove sheet media that is jammed in the transportation path. Installing an operating cover also does not impair the appearance of the device because the part of the cover that covers the support pivot is flush with the other parts of the case.

Preferably, the end-face part of the operating cover that opposes the support-pivot-side end-face part is defined by a concave circular arc surface that is centered on the support pivot and has a radius greater than the radius of the convex circular arc surface.

This arrangement enables providing a small gap between the operating cover and the device case without the operating cover interfering with the case when the operating cover is opened and closed. Furthermore, the outside of the operating cover and the outside of the device case can be positioned so that the outside surfaces are flush without the operating cover interfering with the device case when the operating cover is opened and closed. The part to which the operating cover is positioned can therefore be formed with a more attractive appearance.

If the invention is applied to a media processing device that is constructed so that a U-shaped media transportation path can be opened via an upstream-side operating cover part and a downstream-side operating cover part that pivot open and closed on a common support pivot, the arrangement described next is desirable.

In the media processing device according to this aspect of the invention the upstream-side operating cover part has an inside wall part that defines the upstream-side transportation path portion, an upstream-side end-face part that is contiguous to the end of the inside wall part on the support pivot side, and an outside wall part that is contiguous to the upstream-side end-face part; the downstream-side operating cover part has an inside wall part that defines the downstream-side transportation path portion, a downstream-side end-face part that is contiguous with the end of the inside wall part on the support pivot side, and an outside wall part that is contiguous with the downstream-side end-face part; the upstream-side end-face part has positioned axially to the support pivot an upstream-side convex circular arc surface part that is centered on the support pivot, and an upstream-side concave circular arc surface part centered on the support position; the downstream-side end-face part has positioned axially to the support pivot a downstream-side concave circular arc surface part that is centered on the support pivot, and a downstream-side convex circular arc surface part centered on the support position; the downstream-side concave circular arc surface part opposes the upstream-side convex circular arc surface part, and the downstream-side convex circular arc surface part opposes the upstream-side concave circular arc surface part; the upstream-side convex circular arc surface and the downstream-side convex circular arc surface are identical convex circular arc surfaces; the upstream-side concave circular arc surface and the downstream-side concave circular arc surface are identical concave circular arc surfaces; the concave circular arc surfaces are circular arc surfaces with a larger radius than the convex circular arc surfaces; the inside wall part defining the upstream-side transportation path portion extends tangentially to the upstream-side convex circular arc surface part contiguously from an edge of the upstream-side convex circular arc surface part; and the inside wall part defining the downstream-side transportation path portion extends tangentially to the downstream-side convex circular arc surface part contiguously from an edge of the downstream-side convex circular arc surface part.

When the upstream-side operating cover part and the downstream-side operating cover part that define the U-shaped media transportation path open pivoting on a common support pivot, both the upstream-side transportation path portion and the downstream-side transportation path portion of the media transportation path change to an open position. The upstream-side and downstream-side transportation path portions can therefore be opened with a simple single-action operation, and sheet media that is jammed inside can be easily removed. When the task is completed, the upstream-side and downstream-side transportation path portions can also be returned to the original closed position by the simple single-action operation of pivoting the upstream-side operating cover part and the downstream-side operating cover part closed on the common support pivot. Furthermore, because the operation that changes the upstream-side and downstream-side transportation path portions to the open position and the operation that returns them to the closed position can be done by touching only the upstream-side operating cover part and the downstream-side operating cover part, there is no damage to internal parts or concern about soiling the operator's fingers.

Furthermore, because the contours of the support pivot end parts of the upstream-side operating cover part and the downstream-side operating cover part are formed as described above, the ends of the covers on the support pivot side will not protrude into the transportation path when the covers are opened. The sheet media will therefore not be pressed by these ends of the operating covers to the device case side when the covers are opened in order to remove sheet media jammed in the transportation path.

The operating covers can also be positioned with a narrow gap therebetween without the support pivot side ends of the covers interfering with each other when the covers are opened and closed. In addition, the outside surfaces at the support pivot end of the operating covers can be formed flush with each other with no parts protruding more to the outside than other parts of the case surface. This affords a cleaner appearance.

The media processing device according to the invention can also be used as a check scanning apparatus for reading and processing checks, promissory notes, and invoice stubs, for example.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A preferred embodiment of a media processing device according to the present invention is described below with reference to the accompanying figures.

General Configuration

Figure 1:
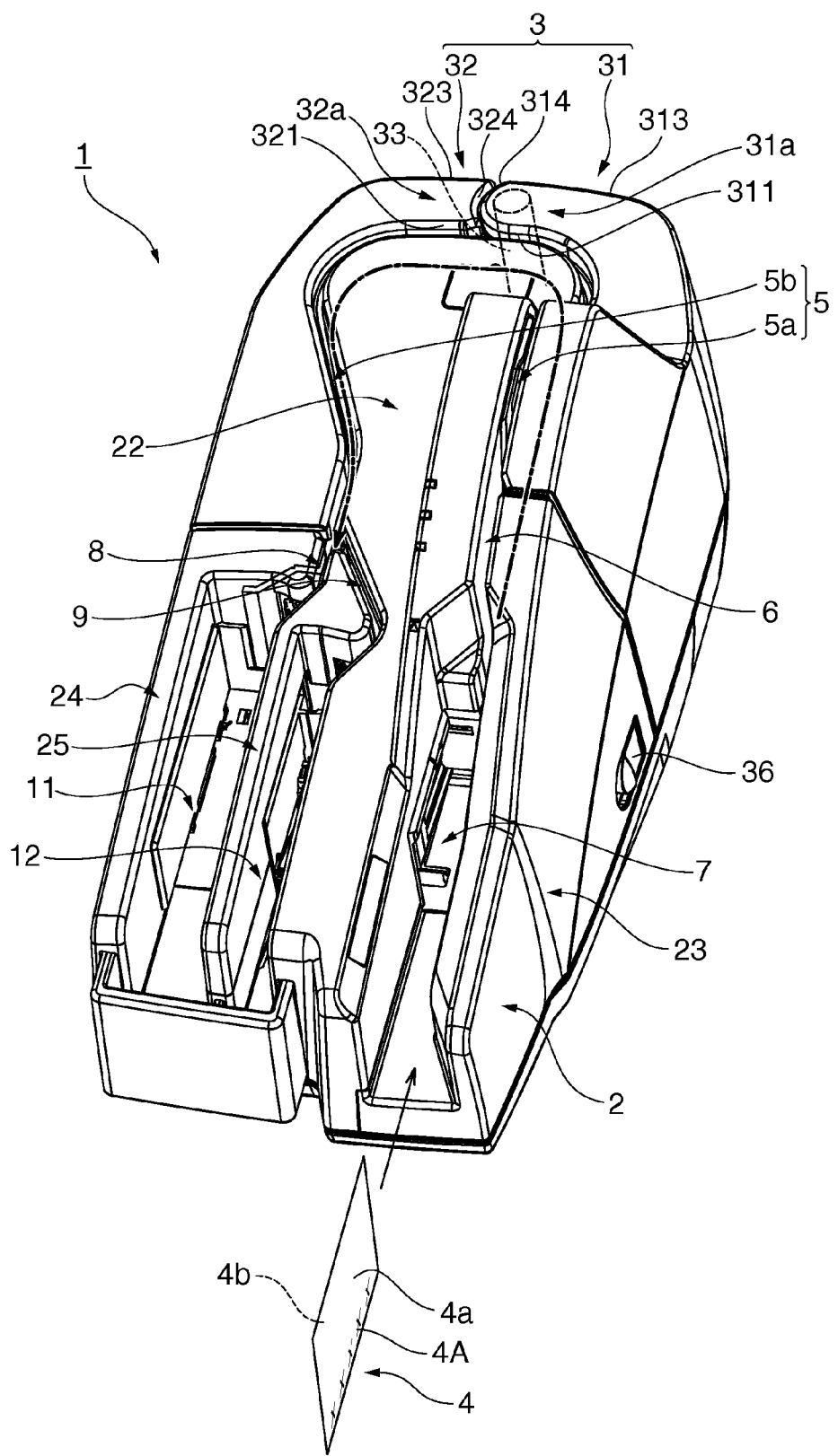
FIG. 1 is an oblique external view of a check processing device according to the present invention.
Figure 2:
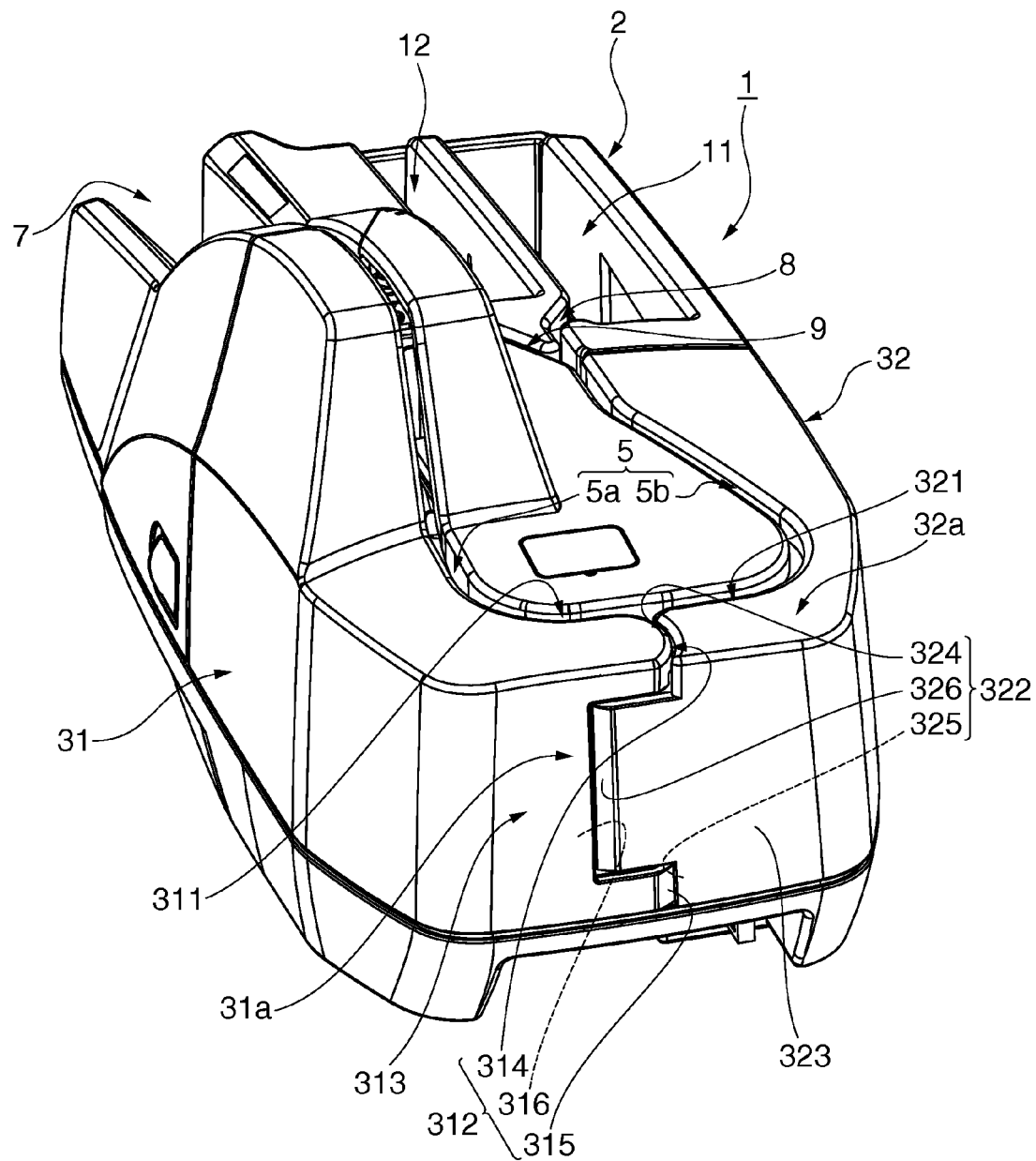
FIG. 2 is an oblique external view of the check processing device from the opposite side as shown in FIG. 1.
Figure 3:
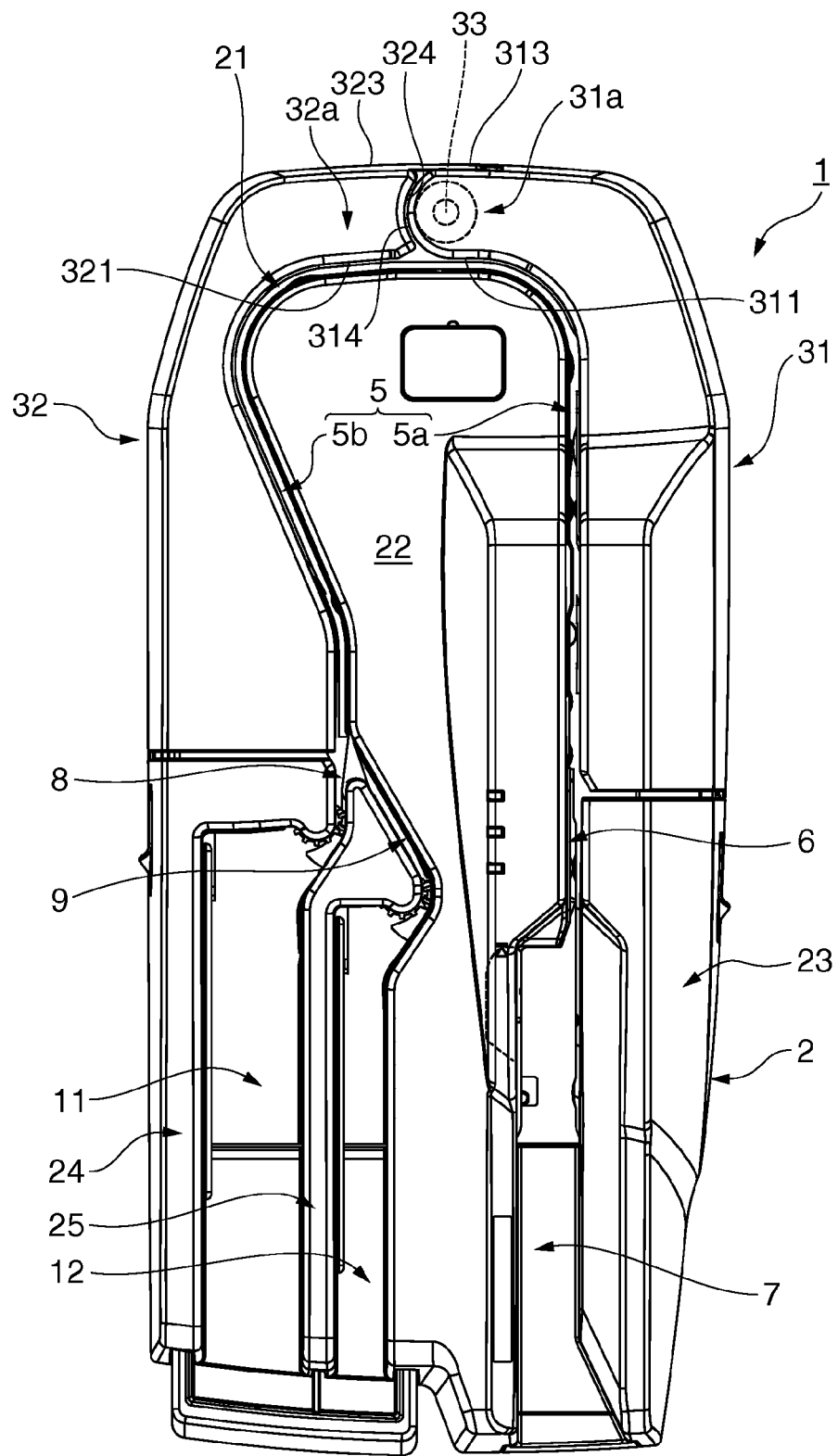
FIG. 3 is a plan view of the check processing device.

FIG. 1 is an external oblique view of a check scanning apparatus 1 according to a preferred embodiment of the invention. FIG. 2 is an external oblique view of the check scanning apparatus 1 from the opposite side as shown in FIG. 1. FIG. 3 is a plan view of the check scanning apparatus 1.

As best seen in FIG. 1, the check processing apparatus according to this embodiment of the invention is a check scanning apparatus 1 that has a case 2 and an operable cover 3. A check transportation path 5 for conveying checks 4 is formed between the case 2 and the operable cover 3.

The check transportation path 5 is a narrow vertical slot that curves in a basically U-shaped configuration when seen from above. The end of the check transportation path 5 on the upstream side of the check transportation direction is connected through a check infeed path 6, which is a narrow vertical slot, with a check supply unit 7, which is a wide vertical slot. The downstream end of the check transportation path 5 is connected through left and right diversion paths 8 and 9 to left and right first and second check discharge units 11 and 12. The diversion paths 8 and 9 are narrow vertical slots branching to the left and right from the check transportation path 5. The first and second check discharge units 11 and 12 are relatively wide vertical slots.

As shown in FIG. 1, the check 4 has an MICR line 4A printed along the long bottom edge on the front 4a of the check 4. Also recorded on the front 4a against a patterned background are the check amount, payer and payee, various numbers, and the payer signature. An endorsement is recorded on the back 4b of the check 4. The checks 4 are loaded in the check supply unit 7 with the tops and bottoms of the checks aligned and the fronts 4a of the checks facing the outside of the U-shaped check transportation path 5.

When a check 4 is delivered from the check supply unit 7 through the check infeed path 6 and then conveyed along the check transportation path 5, the MICR line 4A printed on the front 4a is read and the front 4a and back 4b of the check 4 are scanned. If this information is scanned correctly, PROCESSED or other text is printed on the front or back, and the check 4 is then diverted and discharged into the first check discharge unit 11. If the check 4 cannot be read or a scanning error occurs, nothing is printed and the check 4 is diverted and discharged into the second check discharge unit 12.

Figure 4:
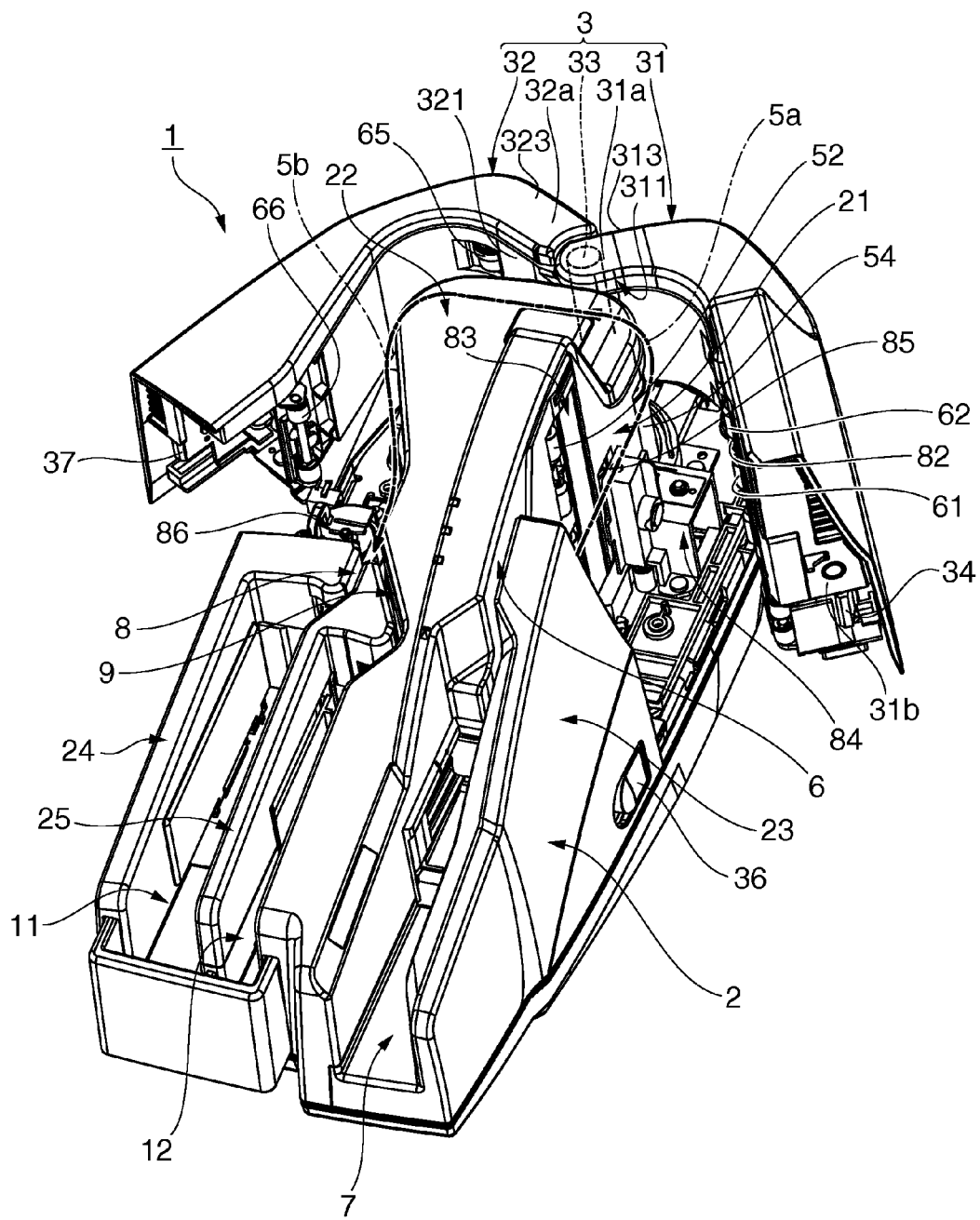
FIG. 4 is an oblique view of the check processing device with the opening and closing covers open.
Figure 5:
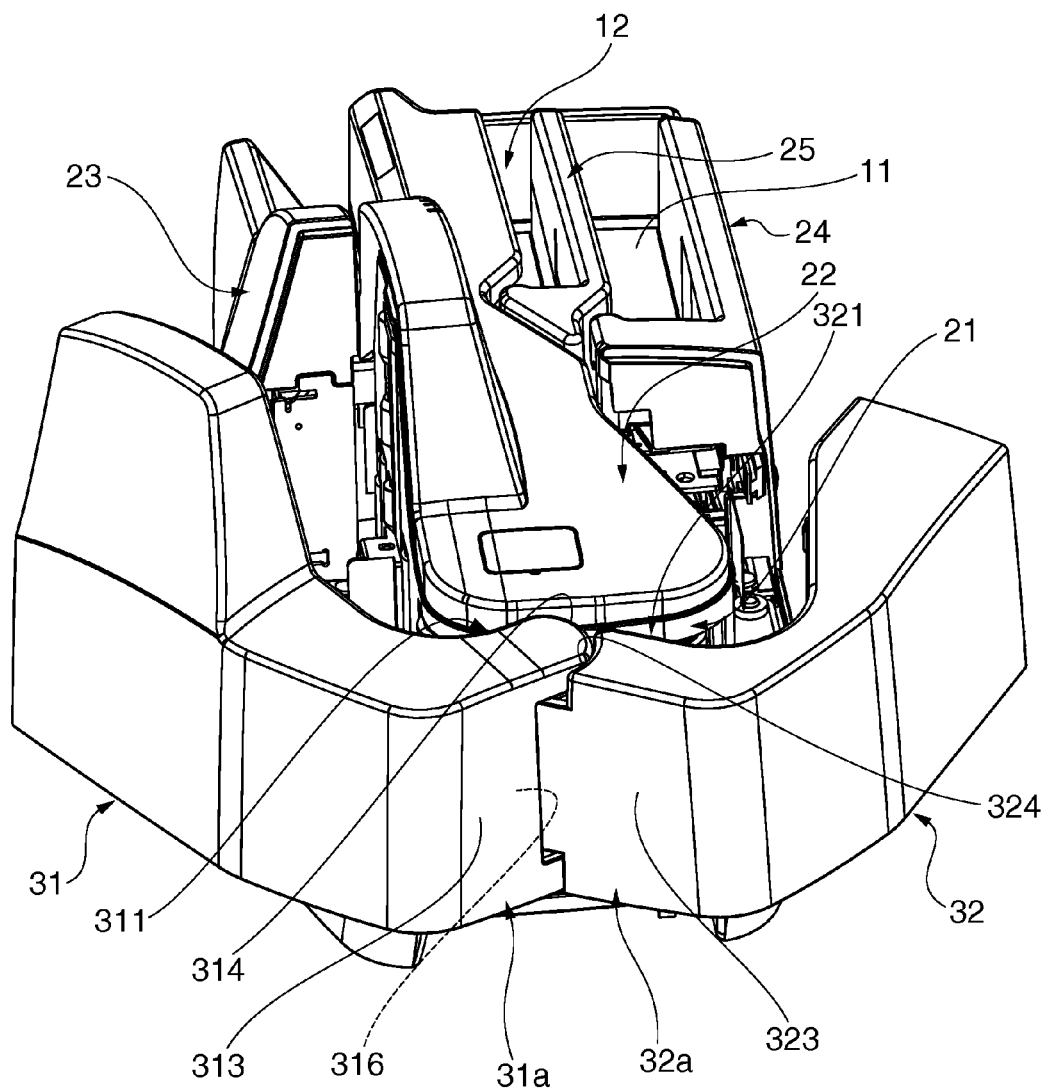
FIG. 5 is an oblique external view of the check processing device from the opposite side as shown in FIG. 4.
Figure 6:
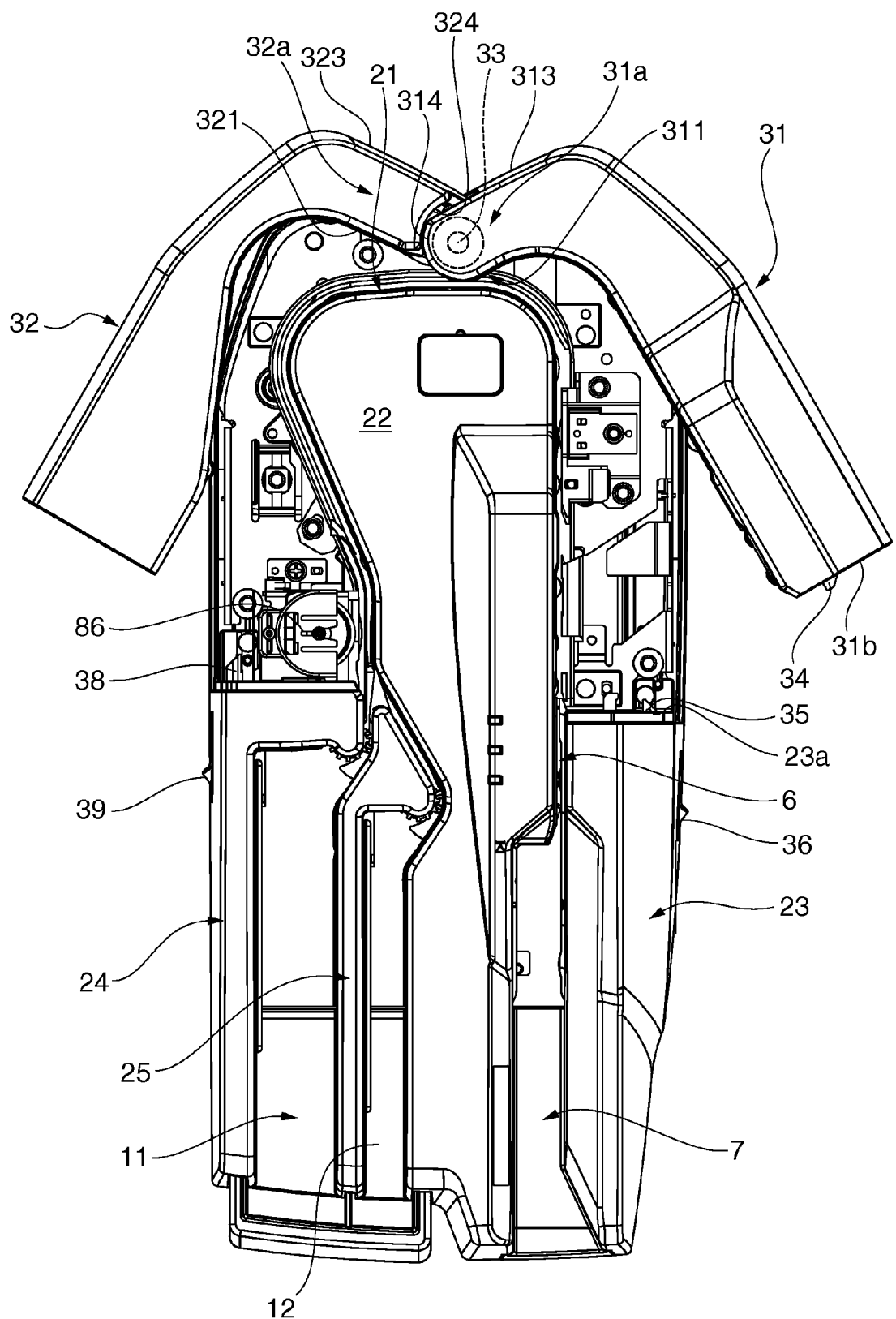
FIG. 6 is a plan view of the check processing device with the opening and closing covers open.
Figure 7:
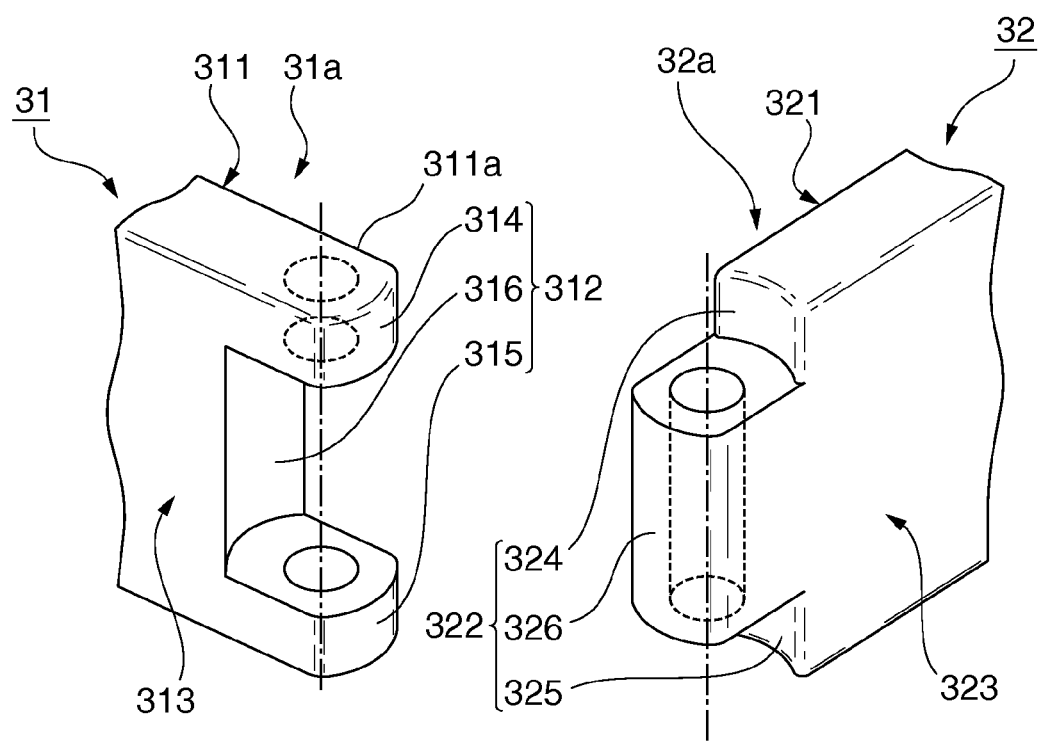
FIG. 7 shows the shape of the end portion on the support pivot side of the opening and closing covers.

FIG. 4 is an external oblique view of the check scanning apparatus 1 from the same side as shown in FIG. 1 and with the operable cover 3 open for access to the transportation path. FIG. 5 is an oblique view of the check scanning apparatus 1 as shown in FIG. 4 but from the opposite side (that is, the same side as shown in FIG. 2). FIG. 6 is a plan view of the check scanning apparatus 1 with the operable cover 3 open as shown in FIG. 4. FIG. 7 shows the part of the operable cover 3 where the operable cover 3 hinges to open and close.

As shown in the accompanying figures, the case 2 has a middle case portion 22, right and left side case portions 23 and 24, and a divider 25 positioned between the middle case portion 22 and the side case portion 24. The middle case portion 22 has a vertical outside wall portion 21 that is contoured to follow the U-shaped check transportation path 5. The check supply unit 7 is formed between the middle case portion 22 and the side case portion 23. The divider 25 divides the space between the middle case portion 22 and the side case portion 24 into left and right sides forming the first and second check discharge units 11 and 12.

The outside wall portion 21 of the middle case portion 22 facing the right and left side case portions 23 and 24 is covered by the operable cover 3 on both the left and right sides.

The operable cover 3 includes an upstream-side cover part 31 on the side case portion 23 side and a downstream-side cover part 32 on the side case portion 24 side. The upstream-side portion 6a of the check transportation path 5 is formed between the middle case portion 22 and the upstream-side cover part 31, and the downstream-side portion 5b of the check transportation path 5 is formed between the middle case portion 22 and the downstream-side cover part 32.

The proximal end portion 31a of the upstream-side cover part 31 and the proximal end portion 32a of the downstream-side cover part 32 are the pivot axis ends of the operable cover 3, and are attached to a vertical support pivot 33 that is positioned on the case 2 so that the upstream-side cover part 31 and the downstream-side cover part 32 can open and close to the right and left. The support pivot 33 is positioned at a location substantially at the midpoint of the U-shaped check transportation path 5 in the transportation direction. As shown in FIG. 4 to FIG. 6, when the upstream-side cover part 31 and the downstream-side cover part 32 open to the right and left, the upstream-side transportation path portion 5a and the downstream-side transportation path portion 5b are also opened.

Transportation Mechanism

Figure 8:
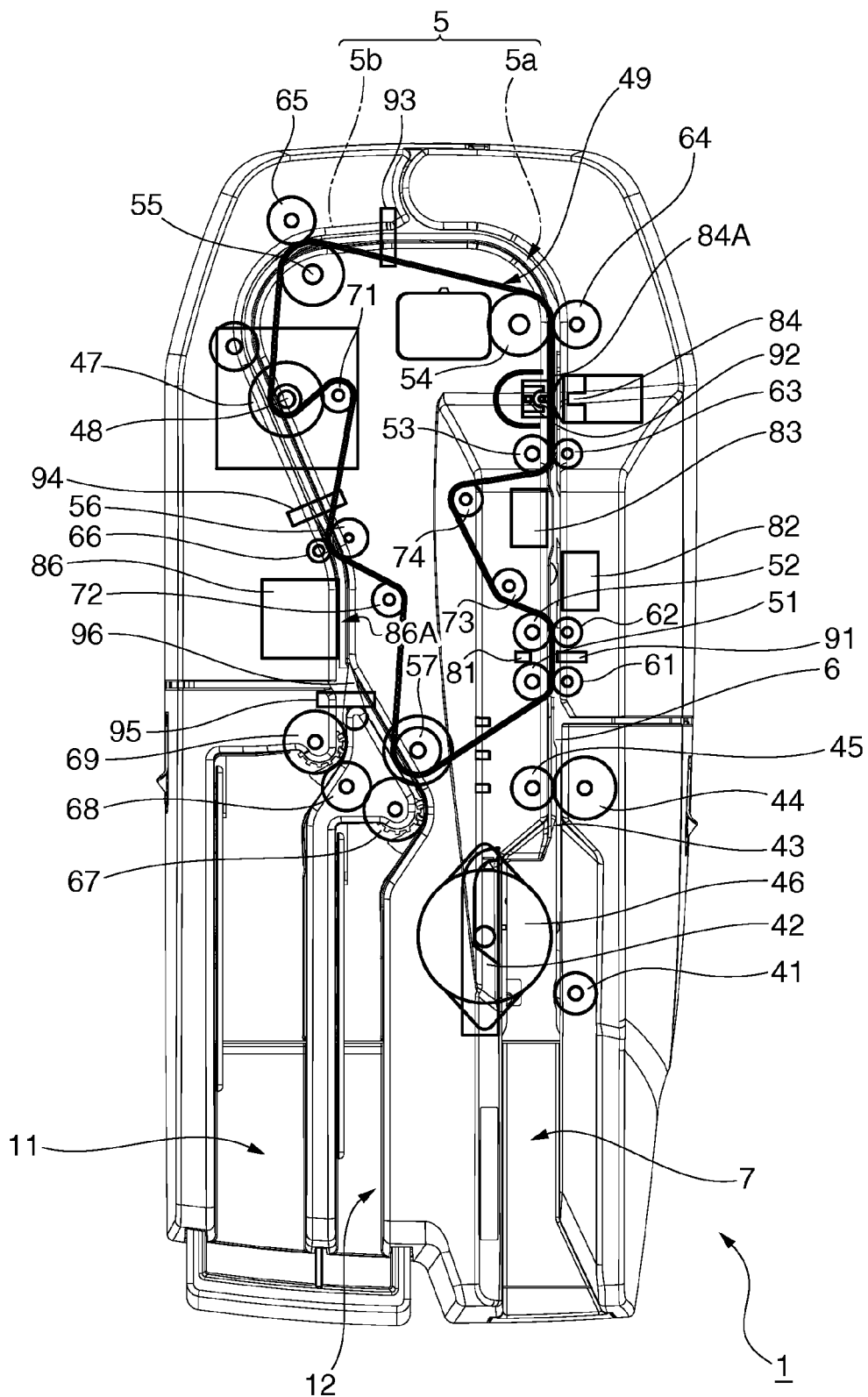
FIG. 8 shows the transportation mechanism of the check processing device.

FIG. 8 shows the transportation mechanism of the check scanning apparatus 1.

An infeed roller 41 and a pressure member 42 are positioned on the check supply unit 7. The infeed roller 41 feeds checks 4 which are loaded in a stack in the check supply unit 7 one at a time into the check transportation path 5. The pressure member 42 presses the checks 4 against the infeed roller 41.

A separation pad 43 and a pair of separation rollers including a separation roller 44 and a retard roller 45 are positioned near the check infeed path 6 for feeding the checks 4 delivered by the infeed roller 41 into the check transportation path 5. The separation pad 43, separation roller 44, and retard roller 45 form a separation mechanism for separating and feeding the checks 4 one at a time from the stack into the check transportation path 5. The infeed roller 41, the separation roller 44, and the pressure member 42 are driven by a common infeed motor 46.

The transportation mechanism for conveying the checks 4 delivered by the infeed roller 41 through the check transportation path 5 includes a transportation motor 47, a drive roller 48 mounted on the rotating shaft of the transportation motor 47, a set of transportation rollers 51 to 57 positioned along the check transportation path 5, and a set of pressure rollers 61 to 67 that are pressed against and rotate with the transportation rollers 51 to 57. Rotation of the pressure roller 67 is transferred through a transfer gear 68 to a discharge roller 69. An endless belt 49 transfers rotation of the transportation motor 47 to the transportation rollers 51 to 57. The endless belt 49 moves along an endless loop from the drive roller 48 past a guide roller 71, a transportation roller 56, a guide roller 72, a transportation roller 57, transportation rollers 51 and 52, guide rollers 73 and 74, transportation rollers 53, 54, and 55, and back to the drive roller 48.

The transportation rollers 51 to 54 are located at the upstream end, the middle, and the downstream part of the upstream-side transportation path portion 5a. The transportation rollers 55 and 56 are located at the upstream part and the middle of the downstream-side transportation path portion 5b, and the transportation roller 57 is located where the checks are discharged into the second check discharge unit 12. Discharge roller 69 is located where the checks are discharged into the first check discharge unit 11.

A magnet 81 for magnetizing the magnetic ink characters is positioned between the transportation rollers 51 and 52 in the upstream-side transportation path portion 5a. A front contact image sensor 82 is positioned as the front image scanner, and a back contact image sensor 83 is positioned as a back image scanner, between the transportation rollers 52 and 53. A magnetic head 84 for magnetic ink character reading and a pressure roller 85 for pressing the checks 4 against the magnetic head 84 are positioned between transportation rollers 53 and 54.

A print mechanism 86 is positioned on the downstream side of the transportation roller 56 in the downstream-side transportation path portion 5b. The print mechanism 86 can move between a printing position applying pressure to the check 4 and a standby position retracted from this printing position via a drive motor (not shown in the figure). The print mechanism 86 can also be formed as a stamp mechanism that is pushed by a plunger to print (stamp) the check 4.

Various sensors for check transportation control are also positioned next to the check transportation path 5.

A paper length detector 91 for detecting the length of the conveyed check 4 is located near the magnet 81.

A multifeed detector 92 for detecting if two or more checks 4 are being fed together is located near the reading position 84A of the magnetic head 84.

A jam detector 93 is located at a position on the upstream side of the transportation roller 55. A check is known to be jammed in the check transportation path 5 if the jam detector 93 detects a check 4 continuously for a prescribed time or longer.

A print detector 94 for detecting the presence of a check 4 printed by the print mechanism 86 is located on the upstream side before the transportation roller 56.

A discharge detector 95 for detecting the discharged check is positioned near the diversion paths 8 and 9 where the check transportation path 5 branches to the first and second check discharge units 11 and 12.

A flapper 96 that is driven by a drive motor (not shown) to switch the discharge path is positioned on the upstream side of the diversion paths 8 and 9. The flapper 96 selectively switches the downstream end of the check transportation path 5 to the first check discharge unit 11 or the second check discharge unit 12, and guides the check 4 to the selected discharge unit.

The distance from the reading position 84A of the magnetic head 84 in the check transportation path 5 to the printing position 86A of the print mechanism 86 is substantially equal to the length of the long side (transportation direction) of the check 4 to be scanned in this embodiment of the invention. As a result, when the leading end of the check 4 reaches the printing position 86A, the trailing end has just passed the reading position 84A of the magnetic head 84. The check 4 is therefore sequentially conveyed by the transportation roller 54 and the pressure roller 64, and by the transportation roller 55 and the pressure roller 65, as the magnetic head 84 reads the magnetic ink characters. The check 4 is also conveyed sequentially by the transportation roller 53 and pressure roller 63, by the transportation roller 54 and the pressure roller 64, and by the transportation roller 55 and the pressure roller 65 as the contact image sensors 82 and 83 image the front and back of the check 4.

Control System

Figure 9:
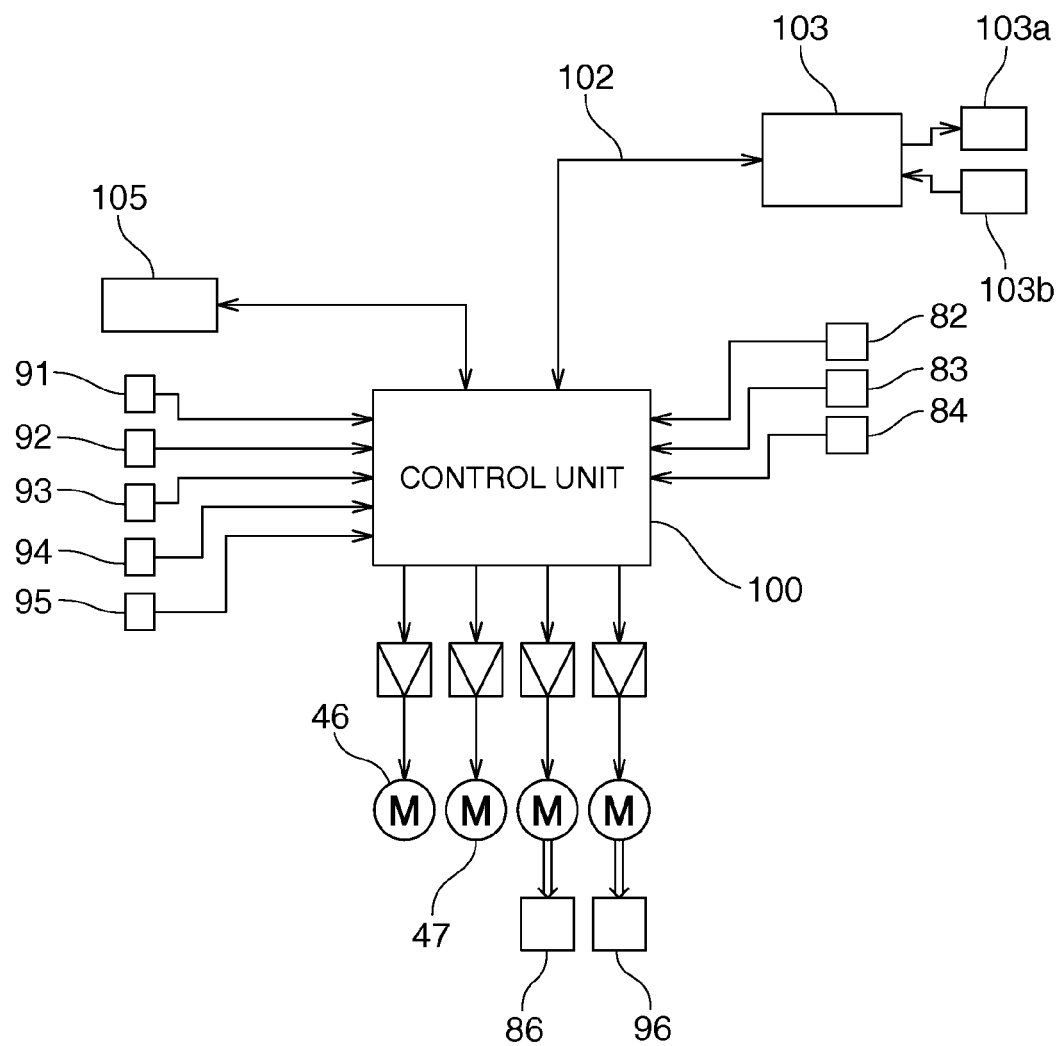
FIG. 9 is a block diagram showing the control system of the check processing device.

FIG. 9 is a block diagram showing the control system of the check scanning apparatus 1. The control system of the check scanning apparatus 1 includes a control unit 100 that includes a CPU, a RAM, and a ROM. The control unit 100 is connected to a host computer system 103 through a communication cable 102. The computer system 103 has a display unit 103a and input/output devices such as a keyboard, mouse, or other operating unit 103b. Check scanning operation start commands and other commands are input from the computer system 103 to the control unit 100.

When a scanning operation start command is received, the control unit 100 drives the infeed motor 46 and transportation motor 47 to feed the checks 4 one at a time into the check transportation path 5 and convey the supplied check 4 through the check transportation path 5. The front image data, back image data, and magnetic ink character data captured from the check 4 by the front contact image sensor 82, the back contact image sensor 83, and the magnetic head 84 are input to the control unit 100. This data is then supplied to the computer system 103 for image processing and character recognition processing. The computer system 103 also determines if the check 4 was scanned normally, and the result is supplied to the control unit 100. Based on this result the control unit 100 controls driving the print mechanism 86 and the flapper 96. Note that these processes can alternatively be executed by the control unit 100 of the check scanning apparatus 1 instead of by the computer system 103.

The control unit 100 controls conveying the check 4 based on the detection signals from the paper length detector 91, the multifeed detector 92, the jam detector 93, the print detector 94, and the discharge detector 95 that are positioned along the check transportation path 5. An operating unit 105 including a power supply switch and other switches is also positioned in the case 2 and connected to the control unit 100.

Check Processing Operation

Figure 10:
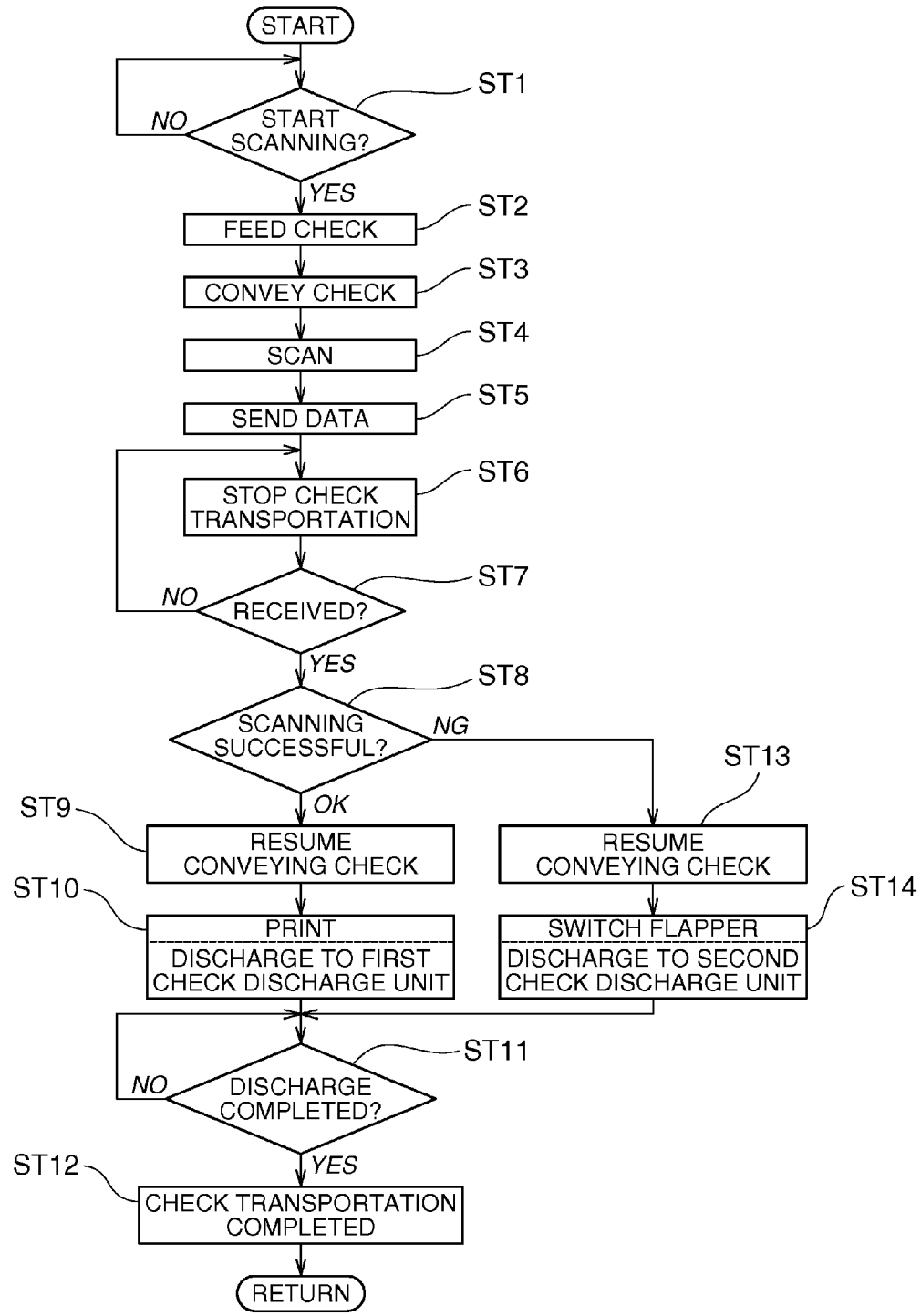
FIG. 10 is a flow chart describing the processing operation of the check processing device.

FIG. 10 is a flow chart showing the operation of the control unit 100 of the check scanning apparatus 1. The scanning operation is described next with reference to this flow chart.

When the operator inputs a start scanning command from the operating unit 103b of the host computer system 103, the infeed motor 46 causes the infeed roller 41 to turn and the pressure member 42 to move and press the checks 4 against the infeed roller 41. One or more checks 4 are thus advanced by the infeed roller 41. The separation mechanism (separation pad 43, separation roller 44, and retard roller 45) positioned next to the check infeed path 6 separates and feeds the checks 4 delivered into the check infeed path 6 one by one into the check transportation path 5 (steps ST1 and ST2).

When the paper length detector 91 detects the leading end of the conveyed check 4, the transportation motor 47 is driven to rotationally drive the transportation rollers 51 to 57. The supplied check 4 is passed sequentially to the transportation rollers 51 to 56 and conveyed through the check transportation path 5 (step ST3). The front and back of the check 4 are scanned and the magnetic ink characters are read by the front contact image sensor 82, the back contact image sensor 83, and the magnetic head 84, respectively, as the check 4 is conveyed (step ST4).

The captured data is then sent through the communication cable 102 to the host computer system 103 (step ST5). The computer system 103 processes the scanned front image, back image, and magnetic ink character data, and determines if the check was read correctly. If the check 4 is fed with the top and bottom upside down, the magnetic ink characters cannot be recognized, and a read error results. If the check 4 is fed with the front and back reversed, the magnetic ink character data cannot be acquired and a read error results. If the check 4 is creased, torn, or skewed when fed so that a portion of the magnetic ink characters cannot be read, a read error results. A read error also results if the check amount or other prescribed information cannot be recognized from the front and back image data because the check 4 is creased, torn, or skewed when fed.

Referring again to the check scanning apparatus 1 side, when the leading end of the conveyed check 4 reaches the printing position 86A of the print mechanism 86, the transportation mechanism pauses conveying the check 4 (step ST6). The position of the leading end of the conveyed check 4 is managed by counting the number of steps the transportation motor 47 is driven from when the paper length detector 91 detects the leading end of the check 4. When conveying the check 4 stops, the check scanning apparatus 1 waits for the scanning determination result from the computer system 103 (step ST7).

If the received scanning determination result indicates that the check 4 was scanned correctly, conveying the check 4 resumes and the print mechanism 86 is simultaneously moved to the printing position (steps ST8 and ST9). The print mechanism 86 prints PROCESSED, for example, on the check 4, and the check 4 is directed into the first check discharge unit 11 by the flapper 96 (step ST10). Driving of the transportation mechanism stops after the discharge detector 95 detects the trailing end of the check 4 (steps ST11 and ST12). Feeding and processing the next check 4 then starts.

If the received scanning determination result indicates that the check 4 was not scanned correctly (step ST8—result NG, i.e. no good), conveying the check 4 resumes (step ST13) and the flapper 96 changes position. The print mechanism 86 is held in the standby position and does not print on the check 4. The check 4 is thus diverted by the flapper 96 and discharged into the second check discharge unit 12 (step ST14). Driving the transportation mechanism stops after the discharge detector 95 detects the trailing end of the check 4 (steps ST11 and ST12), and the operation for scanning the next check 4 then starts.

If the multifeed detector 92 detects a check multifeed state, an interrupt process is executed to immediately stop check transportation, signal a check transportation error to the operator by driving a warning indicator on the operating unit 105, report the transportation error to the computer system 103, and then wait until the checks are removed from the check transportation path 5 and the checks are reset to the starting position. A similar interrupt process is executed if the jam detector 93 detects that a check is jammed in the check transportation path 5.

Operable Cover

The upstream-side cover part 31 and the downstream-side cover part 32 that form the operable cover 3 are described below with reference to FIG. 1 to FIG. 7.

The upstream-side cover part 31 and the downstream-side cover part 32 are normally locked in the closed position by separate latching mechanisms. As shown in FIG. 4 and FIG. 6, the latch mechanism of the upstream-side cover part 31 includes a cover-side strike 34 and a catch 35. The cover-side strike 34 is formed at the bottom of the distal end 31b of the upstream-side cover part 31. The catch 35 is retractably positioned into the end face 23a of the side case portion 23 at a position opposite the cover-side strike 34. The catch 35 is urged in the protruding direction by a spring force (not shown). A sliding release button 36 for releasing the latch is positioned on the outside of the side case portion 23.

When the sliding release button 36 is slid against the spring force, the catch 35 separates from the cover-side strike 34 and the upstream-side cover part 31 can swing open to the side pivoting on the support pivot 33. When the open upstream-side cover part 31 is then closed, the corner of the cover-side strike 34 protruding from the distal end 31b pushes the catch 35 in as the cover-side strike 34 moves to the closed position. When the upstream-side cover part 31 reaches the closed position, the catch 35 engages the cover-side strike 34 and the upstream-side cover part 31 is locked closed. An identical latch mechanism (including a cover-side strike 37, a catch 38, and a sliding release button 39) is positioned on the downstream-side cover part 32.

Referring to FIG. 4, FIG. 5, and FIG. 6, the front contact image sensor 82 and the pressure rollers 61 to 64 that are positioned near the upstream-side transportation path portion 5a are assembled on the upstream-side cover part 31. The pressure rollers 65 and 66 positioned near the downstream-side transportation path portion 5b are assembled on the downstream-side cover part 32.

When the upstream-side cover part 31 opens the upstream-side transportation path portion 5a opens and the scanning surfaces of the front contact image sensor 82 and the back contact image sensor 83 are exposed to the outside of the case 2. The magnetic head 84 that is positioned on the case 2 side is also exposed.

Opening the downstream-side cover part 32 similarly opens the downstream-side transportation path portion 5b, and exposes the print mechanism 86 that is positioned on the case 2 side.

In this embodiment of the invention the magnetic head 84 and the pressure roller 85 are both positioned on the case 2 side, and the magnetic head 84 is positioned so that it can read the MICR line 4A on the check 4. Alternatively, the pressure roller 85 can be positioned on the upstream-side cover part 31 side, and the magnetic head 84 can be positioned on the case 2 side at a location opposite the pressure roller 85. The magnetic head 84 is more exposed to the outside of the case with this arrangement when the upstream-side cover part 31 is open, and therefore makes maintenance easier. In this case the front contact image sensor 82, the back contact image sensor 83, and the print mechanism 86 are located on the opposite side of the check transportation path 5.

If a check 4 becomes jammed in the check transportation path 5 of a check scanning apparatus 1 having this operable cover 3, the right and left sliding release buttons 36 and 39 are operated and the right and left upstream-side cover part 31 and downstream-side cover part 32 open to the right and left pivoting on the support pivot 33. When the latch mechanism is released, the pressure of the pressure rollers against the transportation rollers pushes the upstream-side and downstream-side cover parts 31 and 32 open. A torsion spring or other urging member could also be mounted on the support pivot 33 to urge the upstream-side and downstream-side cover parts 31 and 32 open. With either arrangement, however, the simple single-action operation of sliding the sliding release buttons 36 and 39 can open the covers.

As shown in FIG. 4 to FIG. 6, opening the upstream-side and downstream-side cover parts 31 and 32 opens the check transportation path 5 (upstream-side transportation path portion 5a and downstream-side transportation path portion 5b). A jammed check 4 can therefore be easily removed. After removing the jammed check, the upstream-side and downstream-side cover parts 31 and 32 can also be closed with simple single-action operation.

The upstream-side and downstream-side cover parts 31 and 32 can also be opened in the same way for maintenance of the magnetic head 84, the front contact image sensor 82, the back contact image sensor 83, and the print mechanism 86, including cleaning and replacement of consumables. Because opening the covers exposes the magnetic head 84, the front contact image sensor 82, the back contact image sensor 83, and the print mechanism 86, maintenance tasks can be done easily. Damage to parts other than these parts requiring maintenance can also be avoided by locating them inside the case 2 instead of where they will be exposed when the operable cover 3 is opened.

The check transportation path 5 can thus be opened by the simple operation of swinging the upstream-side cover part 31 and the downstream-side cover part 32 open on a common support pivot 33, and the check transportation path 5 can be returned to the normal closed position by the simple operation of swinging these covers closed on the common support pivot 33. The operation of opening the check transportation path 5 is thus simple, damage to parts not subject to regular maintenance in the check scanning apparatus 1 can be prevented during maintenance, and fingers will not be soiled during maintenance.

The upstream-side and downstream-side cover parts 31 and 32 can also be held with good precision in their respective closed positions because they are locked in the closed positions by separate latch mechanisms.

Configuration of the Support Pivot End Parts of the Operable Cover

The contours of the proximal end portions 31a and 32a of the upstream-side cover part 31 and the downstream-side cover part 32, that is, the contours of the ends at the support pivot 33, are described next with reference to FIG. 7. Note that the support pivot 33 is not shown in FIG. 7 to provide a better view of the shape of the proximal end portions 31a and 32a.

The upstream-side cover part 31 has an inside surface part 311 that defines part of the upstream-side transportation path portion 5a, an upstream-side end-face part 312 (support-pivot-side end-face part) that continues from the support pivot 33 side end of the inside surface part 311, and a outside surface part 313 that continues from the upstream-side end-face part 312.

The downstream-side cover part 32 has an inside surface part 321 that defines part of the downstream-side transportation path portion 5b, a downstream-side end-face part 322 (support-pivot-side end-face part) that continues from the support pivot 33 side end of the inside surface part 321, and an outside surface part 323 that continues from the downstream-side end-face part 322.

As will be apparent from FIG. 2, FIG. 5, and FIG. 7, the upstream-side end-face part 312 of the upstream-side cover part 31 has upstream-side convex surfaces 314 and 315, which center on the support pivot 33 and are formed at the top and bottom axial ends of the support pivot 33, and an upstream-side concave surface 316, which is formed between the upstream-side convex surfaces 314 and 315 and is centered on the support pivot 33.

The contours of the downstream-side end-face part 322 complement the contours of the upstream-side end-face part 312. More particularly, the downstream-side end-face part 322 of the downstream-side cover part 32 includes downstream-side concave surfaces 324 and 325 and a downstream-side convex surface 326. The concave surfaces 324 and 325 center on the support pivot 33 and are formed at the top and bottom axial ends of the of the support pivot 33. The convex surface 326 is formed between the concave surfaces 324 and 325 and is centered on the support pivot 33.

The top and bottom upstream-side convex surfaces 314 and 315 are circular arc surfaces with a central angle of approximately 180 degrees. The downstream-side concave surfaces 324 and 325 oppose the top and bottom upstream-side convex surfaces 314 and 315 with a prescribed gap therebetween, and the convex surface 326 is similarly positioned opposite the concave surface 316 with a prescribed gap therebetween. The upstream-side convex surfaces 314 and 315 and the convex surface 326 are defined by the same convex circular arc surfaces, and the downstream-side convex surface 326 is also a circular arc surface with a central angle of approximately 180 degrees.

The upstream-side concave surface 316 and the downstream-side concave surfaces 324 and 325 are defined by identical concave circular arc surfaces. The radius of these concave circular arc surfaces is slightly greater than the radius of the convex circular arc surfaces that define the upstream-side convex surfaces 314 and 315 and the downstream-side convex surface 326. These concave circular arc surfaces have an arc with a central angle less than 180 degrees, and in this embodiment of the invention are curved surfaces with a central angle of approximately 90 degrees.

At the proximal end portion 31a of the upstream-side cover part 31, the inside surface part 311 that is part of the upstream-side transportation path portion 5a continues tangentially from the ends of the upstream-side convex surfaces 314 and 315. These surfaces therefore do not project into the upstream-side transportation path portion 5a when the upstream-side convex surfaces 314 and 315 rotate to the inside on the support pivot 33.

The inside surface part 321 defining part of the downstream-side transportation path portion 5b at the proximal end portion 32a of the downstream-side cover part 32 likewise continues tangentially from the ends of the downstream-side convex surface 326. The downstream-side convex surface 326 therefore does not project into the downstream-side transportation path portion 5b when it rotates on the support pivot 33 to the inside.

As will be understood from FIG. 3 and FIG. 6, when the contours of the proximal end portions 31a and 32a are set as described above and the upstream-side cover part 31 and the downstream-side cover part 32 are opened, the proximal end portions 31a and 32a do not protrude farther to the inside than when the proximal end portions 31a and 32a are in the closed position. More specifically, the upstream-side convex surfaces 314 and 315 of the proximal end portion 31a and the convex surface 326 of the proximal end portion 32a are described by circular arc surfaces centered on the support pivot 33.

In addition, at the proximal end portion 31a of the upstream-side cover part 31, the inside surface part 311 describing part of the upstream-side transportation path portion 5a continues tangentially to the ends of the upstream-side convex surfaces 314 and 315. As a result, when the upstream-side convex surfaces 314 and 315 rotate to the inside centered on the support pivot 33, that is, when the upstream-side cover part 31 opens, these convex surfaces 314 and 315 do not protrude into the upstream-side transportation path portion 5a.

Likewise at the proximal end portion 32a of the downstream-side cover part 32, the inside surface part 321 describing part of the downstream-side transportation path portion 5b extends tangentially to the end of the convex surface 326. As a result, when the downstream-side convex surface 326 rotates to the inside centered on the support pivot 33, that is, when the downstream-side cover part 32 opens, the downstream-side convex surface 326 does not protrude into the downstream-side transportation path portion 5b.

As described above, the proximal end portions 31a and 32a do not protrude into the transportation path portions 5a and 5b when the upstream-side cover part 31 and the downstream-side cover part 32 are open. Therefore, when the operable covers 31 and 32 are opened in order to remove a check 4 that is stuck in the transportation path portions 5a or 5b, the check 4 will not be pressed against the outside wall portion 21 on the case 2 side as a result of the proximal end portions 31a and 32a protruding into the transportation path portions 5a and 5b. The proximal end portions 31a and 32a will therefore not interfere with removing a jammed check 4.

Furthermore, when both operable covers 31 and 32 are closed, the gap therebetween is minimal, foreign objects will not get inside, and the appearance is not impaired. Yet further, because the outside surface parts 313 and 323 of the operable covers 31 and 32 are substantially flush, a good appearance is maintained, unlike when the surfaces are not in alignment.

The proximal end portions 31a and 32a of both operable covers 31 and 32 are assembled to mate, and the mutually opposed parts thereof are defined by the concentric upstream-side convex surfaces 314 and 315 and downstream-side concave surfaces 324 and 325, and by the upstream-side concave surface 316 and the downstream-side convex surface 326. The operable covers 31 and 32 can therefore open and close without interfering with each other even though the gap between the end portions is small.

As described above, if a check 4 jams in the check transportation path 5 of a check scanning apparatus 1 according to this embodiment of the invention, the right and left sliding release buttons 36 and 39 can be operated to release and open the right and left upstream-side cover part 31 and downstream-side cover part 32 to the right and left pivoting on the support pivot 33. When the latch mechanism is released, the pressure of the pressure rollers 61 to 66 pressed against the transportation rollers 51 to 56 pushes the upstream-side and downstream-side cover parts 31 and 32 open. A torsion spring or other urging member could also be mounted on the support pivot 33 to urge the upstream-side and downstream-side cover parts 31 and 32 open. With either arrangement, however, the simple single-action operation of sliding the sliding release buttons 36 and 39 can open the covers.

As shown in FIG. 4 to FIG. 6, opening the upstream-side and downstream-side cover parts 31 and 32 opens the check transportation path 5 (upstream-side transportation path portion 5a and downstream-side transportation path portion 5b). A jammed check 4 can therefore be easily removed. After removing the jammed check, the upstream-side and downstream-side cover parts 31 and 32 can also be closed with simple single-action operation.

The upstream-side and downstream-side cover parts 31 and 32 can also be opened in the same way for maintenance of the magnetic head 84, the front contact image sensor 82, the back contact image sensor 83, and the print mechanism 86, including cleaning and replacement of consumables. Because opening the covers exposes the magnetic head 84, the front contact image sensor 82, the back contact image sensor 83, and the print mechanism 86, maintenance tasks can be done easily. Damage to parts other than these parts requiring maintenance can also be avoided by locating them inside the case 2 instead of where they will be exposed when the operable cover 3 is opened.

The contours of the proximal end portions 31a and 32a (end parts on the support pivot side) of the upstream-side cover part 31 and the downstream-side cover part 32 are described by convex circular arc surfaces and concave circular arc surfaces centered on the support pivot 33. The inside surface part 311 that defines part of the upstream-side transportation path portion 5a on the upstream-side cover part 31 extends tangentially from the ends of the upstream-side convex surfaces 314 and 315. Likewise, the inside surface part 321 that defines part of the downstream-side transportation path portion 5b extends tangentially from the end of the convex surface 326.

Therefore, when the operable covers 31 and 32 are opened, the proximal end portions 31a and 32a will not protrude farther to the inside than when in the closed position. More specifically, the proximal end portions 31a and 32a at the support pivot 33 side will not protrude into the transportation path portions 5a and 5b. Therefore, when the operable covers 31 and 32 are opened in order to remove a check 4 that is stuck in the transportation path portions 5a or 5b, the check 4 will not be pressed against the outside wall portion 21 on the case 2 side by the proximal end portions 31a and 32a of the operable covers 31 and 32.

In addition, the outside surface parts 313 and 323 of the proximal end portions 31a and 32a of the operable covers 31 and 32 form a flat, flush surface, and thus afford a better appearance than when the part that covers the support pivot 33 protrudes further to the outside.

Furthermore, because the proximal end portions 31a and 32a are assembled with concave circular arc surfaces opposing concentrically matching convex circular arc surfaces, the gap therebetween can be small without opposing surfaces interfering with each other when opening and closing. The operable covers 31 and 32 that are provided for opening the check transportation path 5 in this embodiment of the invention will therefore not impair the appearance of the check scanning apparatus 1.

The present invention can be used in media processing devices other than check scanning apparatuses for processing checks, promissory notes, and invoice stubs. The invention can, for example, be used in a scanner apparatus for processing tickets such as entrance tickets.

The invention being thus described, it will be evident that it may be varied in many ways. Such variations are not to be regarded as a departure from the spirit and scope of the invention, and all such modifications as would be obvious to one skilled in the art are intended to be included within the scope of the following claims.

What is claimed is:

1. A media processing device comprising:
    a media transportation path through which sheet media is conveyed;
    a device case that forms the media transportation path;
    an operating cover openably and closably attached to the device case;
    a support pivot that determines the opening and closing axis of the operating cover;
    a check supply unit that supplies checks as the sheet media to the media transportation path; and
    a check discharge unit that receives checks discharged from the media transportation path; and
    wherein a transportation path portion that is at least a part of the media transportation path is formed between the device case and the operating cover in the closed position.

2. The media processing device described in claim 1, wherein:
    the media transportation path has a prescribed width that extends and curves in a U-shaped configuration;
    the operating cover comprises an upstream-side operating cover part that defines an upstream-side transportation path portion of the media transportation path, and a downstream-side operating cover part that defines a downstream-side transportation path portion of the media transportation path; and
    the upstream-side operating cover part and the downstream-side operating cover part open and close on the support pivot, which forms the open/close axis.

3. The media processing device described in claim 2, further comprising:
    an upstream-side transportation roller for conveying the sheet media along the upstream-side transportation path portion;
    an upstream-side pressure roller for pressing the sheet media against the upstream-side transportation roller;
    a downstream-side transportation roller for conveying the sheet media along the downstream-side transportation path portion; and
    a downstream-side pressure roller for pressing the sheet media against the downstream-side transportation roller;

wherein the upstream-side transportation roller and the downstream-side transportation roller are positioned in the device case;

the upstream-side pressure roller is positioned in the upstream-side operating cover part; and the downstream-side pressure roller is positioned in the downstream-side operating cover part.

4. The media processing device described in claim 2, further comprising:

an upstream-side latch mechanism that locks the upstream-side operating cover part in the closed position;

an upstream-side operating member that is operated to disengage the lock of the upstream-side latch mechanism;

a downstream-side latch mechanism that locks the downstream-side operating cover part in the closed position; and a downstream-side operating member that is operated to disengage the lock of the downstream-side latch mechanism.

5. The media processing device described in claim 2, wherein:

the upstream-side operating cover part has an upstream-side inside wall part that defines the upstream-side transportation path portion, an upstream-side end-face part that is contiguous with an end of the upstream-side inside wall part on the support pivot side, and an upstream-side outside wall part that is contiguous with the upstream-side end-face part;

the downstream-side operating cover part has a downstream-side inside wall part that defines the downstream-side transportation path portion, a downstream-side end-face part that is contiguous with an end of the downstream-side inside wall part on the support pivot side, and a downstream-side outside wall part that is contiguous with the downstream-side end-face part;

the upstream-side end-face part has positioned axially to the support pivot an upstream-side convex circular arc surface part that is centered on the support pivot, and an upstream-side concave circular arc surface part centered on the support pivot;

the downstream-side end-face part has positioned axially to the support pivot a downstream-side concave circular arc surface part that is centered on the support pivot, and a downstream-side convex circular arc surface part centered on the support position;

the downstream-side concave circular arc surface part opposes the upstream-side convex circular arc surface part, and the downstream-side convex circular arc surface part opposes the upstream-side concave circular arc surface part;

the upstream-side convex circular arc surface and the downstream-side convex circular arc surface are approximately identical convex circular arc surfaces;

the upstream-side concave circular arc surface and the downstream-side concave circular arc surface are approximately identical concave circular arc surfaces;

the concave circular arc surfaces are circular arc surfaces with a larger radius than the convex circular arc surfaces;

the inside wall part defining the upstream-side transportation path portion extends tangentially to the upstream-side convex circular arc surface part contiguously from an edge of the upstream-side convex circular arc surface part; and the inside wall part defining the downstream-side transportation path portion extends tangentially to the downstream-side convex circular arc surface part contiguously from an edge of the downstream-side convex circular arc surface part.

6. The media processing device described in claim 1, further comprising:

a magnetic head, positioned in the media transportation path, that reads magnetic ink characters printed on the sheet media; and wherein opening the operating cover exposes the magnetic head to an outside of the device case.

7. The media processing device described in claim 1, further comprising:

an image scanning apparatus, positioned near the media transportation path, that scans the sheet media;

wherein opening the operating cover exposes the image scanning apparatus to an outside of the device case.

8. The media processing device described in claim 7, wherein:

the image scanning apparatus includes a first image scanning device positioned on a device case side of the media transportation path, and a second image scanning device positioned on the operating cover.

9. The media processing device described in claim 1, further comprising:

a print mechanism, positioned near the media transportation path, that prints on the sheet media;

wherein opening the operating cover exposes the print mechanism to an outside of the device case.

10. The media processing device described in claim 1, wherein:

the operating cover comprises an inside wall part that defines the transportation path portion, and a support-pivot-side end-face part that defines the end on the support pivot side;

the support-pivot-side end-face part is defined by a convex circular arc surface centered on the support pivot; and the inside wall part extends tangentially to the convex circular arc surface from an end of the convex circular arc surface.

11. The media processing device described in claim 10, wherein:

the operating cover comprises an opposing end-face part that opposes the support-pivot-side end-face part, and the opposing end-face part is defined by a concave circular arc surface that is centered on the support pivot and has a radius greater than the radius of the convex circular arc surface.

* * * * *